W. C. SWIFT.
BALL BEARING.
APPLICATION FILED OCT. 8, 1909. RENEWED MAR. 27, 1911.
993,471.
Patented May 30, 1911.
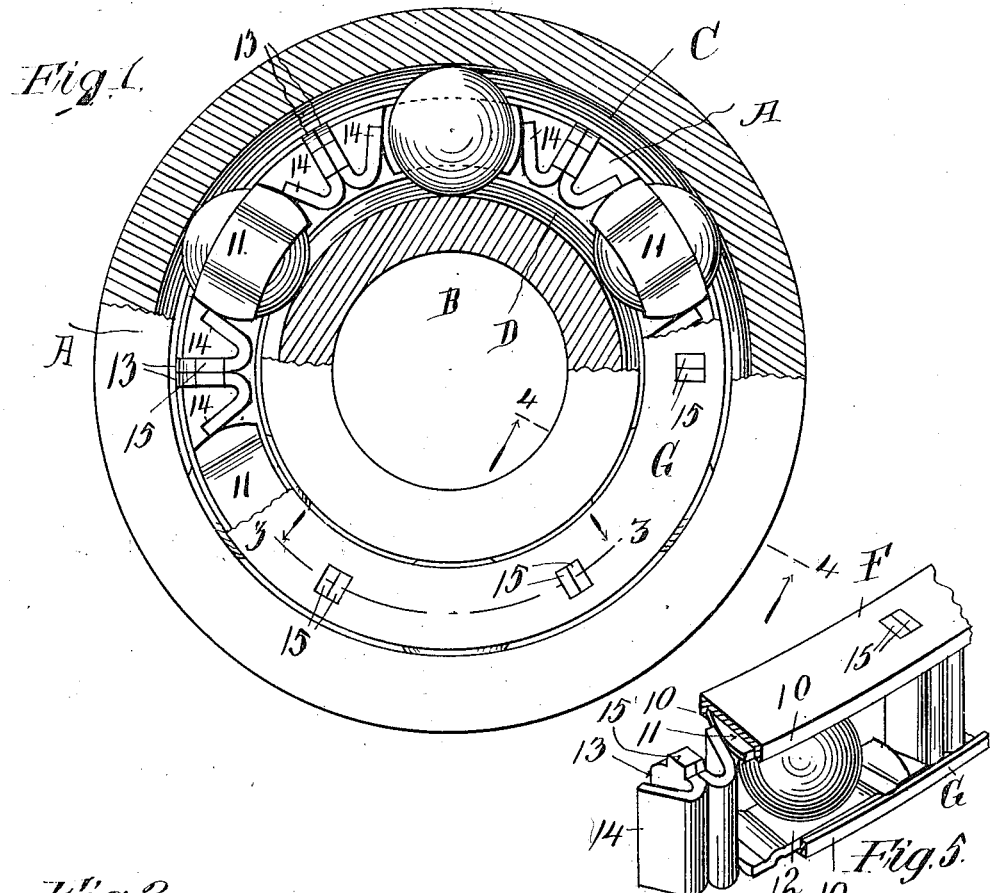
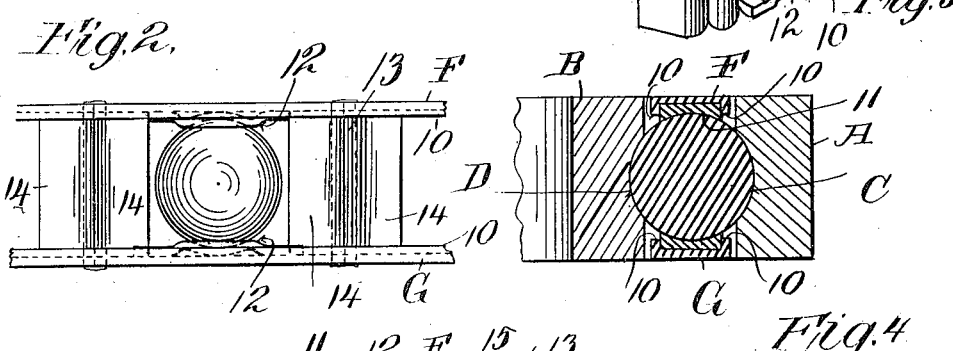

UNITED STATES PATENT OFFICE.

WILLIS C. SWIFT, OF HINSDALE, ILLINOIS.

BALL-BEARING.

993,471.

Specification of Letters Patent.

Patented May 30, 1911.

Application filed October 8, 1909, Serial No. 521,768. Renewed March 27, 1911. Serial No. 617,233.

*To all whom it may concern:*

Be it known that I, WILLIS C. SWIFT, a citizen of the United States, residing at Hinsdale, in the county of Dupage, State of Illinois, have made a certain new and useful Invention in Ball-Bearings, of which the following is a specification.

This invention relates to ball bearings.

The object of the invention is to provide a ball bearing which is simple in construction and efficient in operation, and wherein friction is eliminated to the greatest degree possible.

A further object is to provide a ball bearing construction wherein the balls are maintained separated or spaced apart without interposing between adjacent balls separators against which said balls respectively contact.

A further object of the invention is to provide a ball bearing construction in which each ball is engaged by an endwise sliding socket piece, applied to the surface of the ball at a point where there is least surface movement when the ball rotates, and which socket piece is yieldingly maintained against endwise sliding movement.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views and reference signs appearing thereon, Figure 1 is a view partly in side elevation, and partly in section, showing a construction of ball bearing embodying the principles of my invention. Fig. 2 is a detached detail broken view in top plan of a portion of the retaining rings showing a ball and its carrying endwise slidable socket pieces, and means for yieldingly restraining the endwise sliding movements of the socket pieces, all in assembled relation. Fig. 3 is a broken section on the line 3, 3, Fig. 1, looking in the direction of the arrows. Fig. 4 is a broken view in transverse section on the line 4, 4, Fig. 1, looking in the direction of the arrows. Fig. 5 is a broken view in perspective of the construction shown in Fig. 2.

The same part is designated by the same reference sign wherever it occurs throughout the several views.

In the operation of ball bearings, the balls theoretically run freely in their raceway. There is a tendency, however, for the balls to relatively creep along the raceway especially when they are under load, and eventually to contact with each other. Since the proximate surfaces of adjacent balls revolve or move in opposite directions, a very objectionable friction is developed in case adjacent balls crowd or creep toward each other sufficiently to make contact with each other, thereby seriously impairing if not destroying the efficiency of the ball bearing. To avoid this objection various expedients have been devised for maintaining adjacent balls separated. In one form an intermediate or separating ball of smaller diameter is interposed between adjacent load-carrying or bearing balls. This expedient, while serving to maintain the bearing balls out of contact with each other, encounters another serious difficulty, namely, being necessarily of smaller diameter than that of the bearing balls, they ordinarily engage the bearing balls at points where an objectionable wedging action takes place whenever the bearing balls are crowded thereagainst, thereby producing an undesirable friction which might easily offset the advantage gained by separating the bearing balls. In another form blocks of metal sliding in the raceway between the bearing balls have also been used for this purpose, but these devices are caused to bear against the adjacent bearing balls at points where the surface movement of the bearing balls is greatest, namely, at the points where the ball is in closest proximation to the next adjacent ball, thereby introducing an objectionable additional friction which materially decreases the efficiency of the bearing.

In my pending application, Serial No. 514,476, filed August 25, 1909, I have shown, described and claimed a construction and arrangement having among its special purposes and objects the provision of an efficient means for obviating the above noted objections. The present invention relates more particularly to the type of structure set forth in my said application, and has for one of its special objects and purposes, the provision of a ball bearing structure in which there is no separating contact of the bearing balls with separators interposed transversely in the raceway between adjacent balls.

In accordance with my present invention, and as one concrete form of embodiment thereof, I employ retaining rings on opposite sides of the raceway between the cup and cone in which the balls operate, and for each ball I employ socket pieces mounted to slide endwise in the side retaining rings, the bearing ball being retained between the pair of socket pieces, and, while the socket pieces are endwise slidable in or with reference to the retaining rings, I propose to provide means for yieldingly opposing such sliding movement.

In the drawing reference signs A and B, designate respectively the parts between which the balls are to be interposed, and which may be called, for convenience, the cone and cup respectively, these parts being provided with grooves or seats D, which, together, form the raceway in which the balls E operate. Intermediate the parts A, B, and on opposite sides of the raceway formed therebetween, are the retaining rings or plates F, G. These rings or plates, in their preferred form, are provided with inwardly extended edge flanges 10, forming channels. In these channels are mounted the socket pieces 11, one on each side of each ball, each socket piece having a bearing seat 12, intermediate its ends, to engage the ball, said bearing seats, if desired, conforming to the curvature of the adjacent or contacting surface of the ball. The relation of the parts, when assembled, is such that the bearing contact of the socket pieces 11, against the bearing ball is at the hub, so to speak, of the ball, that is, at the ends of the axis about which the ball revolves within the raceway, and hence at points where there is the least amount of surface movement of the ball. By reason of this relation, location and arrangement, I am enabled to eliminate friction to the greatest possible degree. Any movement of the ball in its tendency to creep or move along the raceway when under load is transmitted through the ball to the socket pieces 11, thereby imparting a tendency to said socket pieces to move endwise in their channels in the side rings. If these socket pieces were held rigidly this creeping tendency of the balls under load would result in developing an objectionable friction. I therefore so arrange the parts that the socket pieces 11 are permitted to move endwise in their channel seats in the rings or plates, but such endwise movement of the socket pieces is yieldingly opposed. This yielding opposition may be accomplished in many specifically different ways. I have shown one simple arrangement as an operative embodiment of my invention wherein plates 13, are interposed transversely of the raceway between adjacent balls, said plates having spring flanges 14, arranged to bear against the ends of the socket pieces. The plates 13, may be supported in any suitable or convenient manner. I have shown a simple arrangement wherein the end portions 15, of said plates extend through openings in the ring plates F, G, said ring plates thereby forming supports for said spring plates.

A ball bearing embodying the construction above set forth, is not only exceedingly simple, but friction is eliminated to the greatest possible extent. The points of contact of the balls with the cone and cup being practically the only points of wearing friction. The points of contact of the bearing balls in the seats of the socket pieces 11, are at the hub, so to speak, of the balls, that is, at the points where there is the least surface movement of the balls, and consequently where any developed friction is at a minimum. The tendency of the balls, when under load, to creep toward each other, is transmitted to the socket pieces 11. These pieces, however, are yieldingly held against any creeping or endwise movement in the channels of the retaining rings, the spring flanges 14, engaging the ends of the socket pieces accomplishing this result, and consequently the balls are free to exert their creeping tendency when under load, but any resulting creeping is prevented from being carried to the point of actual contact of the balls with each other.

Many variations and changes in the details of construction and arrangement might readily occur to persons skilled in the art, and still fall within the spirit and scope of my invention, as defined in the claims. But Having now set forth the object and nature of my invention, and a construction embodying the principles thereof, what I claim as new and useful, and of my own invention, and desire to secure by Letters Patent is:

1. In a ball bearing, an inner and an outer bearing ring having a raceway formed therebetween, and bearing balls operating in said raceway, of socket pieces applied to the balls at the ends of the axes about which they revolve, and means for yieldingly restraining said socket pieces from endwise movement.

2. The combination with an inner and an outer bearing ring having a raceway therebetween, and bearing balls working in said raceway, of socket pieces applied on opposite sides of the balls, at the ends of the axes about which the balls revolve, and means for yieldingly restraining the said socket pieces from endwise movement.

3. The combination with an inner and an outer bearing ring having a raceway therebetween, and bearing balls working in said raceway, of endwise movable socket pieces applied to said balls on opposite sides thereof at the ends of the axes about which they revolve, and yielding means engaging the ends of said socket pieces.

4. The combination with an inner and an outer bearing ring having a raceway therebetween, and bearing balls working in said raceway, of retaining rings for said balls, and socket pieces separted by said rings and engaging the balls from opposite sides thereof, and means for yieldingly restraining said socket pieces from endwise movement.

5. The combination with an inner and an outer bearing ring having a raceway therebetween, and bearing balls working in said raceway, of socket pieces having seats formed therein for application to the opposite sides of the balls at the ends of the axes about which they revolve, said socket pieces being endwise movable, and means for yieldingly restraining the endwise movement of said socket pieces.

6. The combination with an inner and an outer bearing ring having a raceway therebetween, and bearing balls working in said raceway, of channel-shaped retaining rings for the balls, socket pieces mounted to slide in the channels of said rings and arranged to engage the balls on opposite sides thereof, and means for yieldingly opposing the endwise movement of said socket pieces.

7. The combination with an inner and an outer bearing ring having a raceway therebetween, and bearing balls working in said raceway, of retaining rings for said balls, socket pieces mounted to slide endwise on said rings and engaging on opposite sides of said balls, and plates having spring flanges interposed between adjacent ends of said socket pieces.

In testimony whereof I have hereunto set my hand in the presence of the subscribing witnesses, on this 25th day of September A. D., 1909.

WILLIS C. SWIFT.

Witnesses:
CLARENCE C. HUNICKE,
J. E. KLEIN.

Copies of this patent may be obtained for five cents each, by addressing the "Commissioner of Patents, Washington, D. C."